Sept. 17, 1963     C. L. LOVERCHECK     3,104,084
LANDING GEAR FOR AIRCRAFT
Filed May 4, 1960
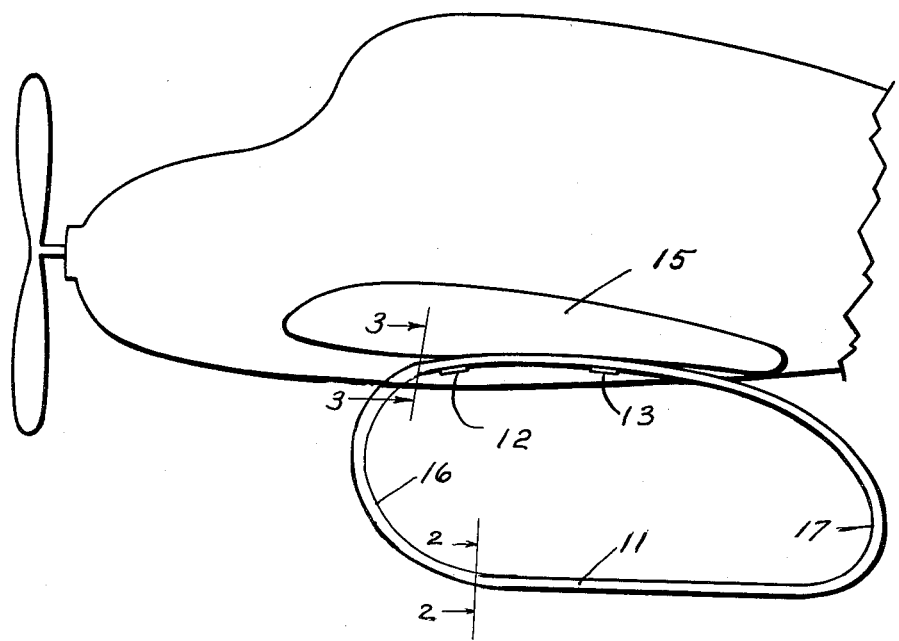
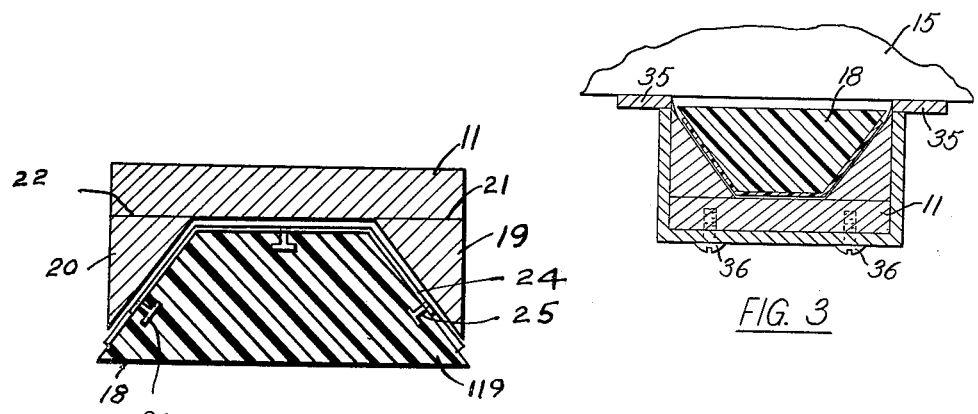
INVENTOR.
Charles L. Lovercheck

United States Patent Office 3,104,084
Patented Sept. 17, 1963

3,104,084
LANDING GEAR FOR AIRCRAFT
Charles L. Lovercheck, 632 W. 7th St., Erie, Pa.
Filed May 4, 1960, Ser. No. 26,763
7 Claims. (Cl. 244—100)

This invention relates to supports for vehicles and, more particularly, to landing gear for aircraft.

Various efforts have been made to provide track type landing gear for aircraft but none have been successful. This has been partly because it has been necessary to provide complex mechanisms such as rollers, belt tighteners, springs, and the like to support the belt and tread and, therefore, the complexity of the arrangement has made it impractical.

It is, accordingly, an object of the present invention to provide an improved landing gear for aircraft.

Another object of the invention is to provide an improved support for a vehicle combining a track and a spring arrangement.

Still another object of the invention is to provide an improved spring and tread arrangement for a vehicle.

A further object of the invention is to provide a landing gear which is simple in construction, economical to manufacture, and simple and efficient in operation.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawing:

FIG. 1 is a side view of an aircraft with the improved landing gear arrangement thereon;

FIG. 2 is a cross sectional view taken on line 2—2 of FIG. 1; and

FIG. 3 is a cross sectional view taken on line 3—3 of FIG. 1.

Now with more particular reference to the drawing, the present invention contemplates the use of a spring 11 formed in a loop. The spring 11 may be bolted at 12 and 13 to a vehicle. In this instance, it may be bolted to an airplane wing 15.

The spring 11 is bent around a large radius of curvature at the front at 16 so that it will ride up over obstructions in the ground and the like. It is bent around a smaller radius of curvature at 17 to form a return for a belt 18.

The spring 11 may be made of steel or it could be made of a fiber impregnated plastic. The spring 11 may be of a leaf type spring bent in the form of a loop as shown and it will be of sufficient resiliency to accommodate and absorb shocks resulting from the aircraft's landing.

Guide members 19 and 20 are attached to the spring 11 at 21 and 22 by bonding, cementing, or other suitable means. The belt 18 has a portion 119 thereof made of rubber or polyurethane or some other well known material having a high coefficient of friction between it and cement or soil. Around the portion 119 is supported a layer of material 24 which is keyed at 25 and 26 to the material 119.

The spring 11 is attached to the aircraft wing 15 by means of a bracket 35. The bracket 35 is attached to the aircraft wing 15 to the structural members thereof. The bracket 35 is generally in the form of a U shape and has the upper part of the spring 11 attached thereto by means of bolts 36 which extend through holes in the bracket and threadably engage the spring 11.

The belt 18 runs through the space between the legs of the U-shaped bracket and between the spring 11 and the aircraft wing 15.

The material 24 is preferably made of Teflon which has a low coefficient of friction relative to steel and metals. The Teflon 24 actually has such a low coefficient of friction with steel that it will effectively lubricate itself upon contact with the steel.

The Teflon material has the property of embedding particles thereof in the steel surface of the spring 11 so that it will have an almost friction free perfect sliding surface between the belt 18 and the spring 11.

It will be noted that when the aircraft lands, the material 119 will engage the ground and the weight of the aircraft will be carried on the belt 18 between the Teflon surface 24 and the spring 11. Therefore, the belt 18 will slide around the spring 11 and act as a Caterpillar tread thereon.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A support for a vehicle comprising an elongated track of a fixed length made of spring material shaped in the form of a loop adapted to be attached to a vehicle, the bottom of said loop supported solely by the ends thereof, and a belt on said track, said belt having a surface engaging said track having a low coefficient of friction relative to the material of said track.

2. In combination, a belt and a track made of spring material shaped in the form of a loop adapted to be attached to a vehicle, the bottom of said loop supported solely by the ends thereof and having a fixed length, said belt having a surface thereon engaging said track having a low coefficient of friction relative to said track.

3. The combination recited in claim 2 wherein the material of said belt engaging said track is Teflon.

4. A support for a vehicle comprising a continuous spring bent in the shape of a loop, the bottom of said loop supported solely by the ends thereof, means to attach said spring to a vehicle, and a belt on said spring and running around the outside thereof, said belt having a surface of Teflon engaging said spring.

5. An aircraft and a landing gear in combination therewith, said aircraft having structural members extending laterally therefrom, spring members, each said spring member being bent in the form of a loop, the bottom of said loop supported solely by the ends thereof, track means on said loop, and a belt on said track means running around said loop, the surface of said belt engaging said track means having a low coefficient of friction relative to said spring members.

6. The combination recited in claim 5 wherein said surface of said belt is made of Teflon.

7. The combination recited in claim 5 wherein said surface of said belt is made of a material having substantially the same coefficient of friction on steel as Teflon.

References Cited in the file of this patent

UNITED STATES PATENTS

| | | |
|---|---|---|
| 809,048 | Furchtbar | Jan. 2, 1906 |
| 935,075 | Wells | Sept. 28, 1909 |
| 1,309,152 | Pain | July 8, 1919 |
| 1,618,441 | Klinker | Feb. 22, 1927 |
| 2,484,754 | Silva | Oct. 11, 1949 |
| 2,809,130 | Rappaport | Oct. 8, 1957 |